United States Patent
Hattori

(10) Patent No.: US 11,825,054 B2
(45) Date of Patent: Nov. 21, 2023

(54) IMAGE PROCESSING DEVICE DISABLING SPECIFIC OPERATION TO CAUSE COMMUNICATION INTERFACE TO COMMUNICATE WITH SERVER

(71) Applicant: BROTHER KOGYO KABUSHIKI KAISHA, Nagoya (JP)

(72) Inventor: Yuka Hattori, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/479,402

(22) Filed: Sep. 20, 2021

(65) Prior Publication Data

US 2022/0103716 A1 Mar. 31, 2022

(30) Foreign Application Priority Data

Sep. 30, 2020 (JP) ................................. 2020-165327

(51) Int. Cl.
*G06F 15/00* (2006.01)
*H04N 1/327* (2006.01)
*H04N 1/00* (2006.01)

(52) U.S. Cl.
CPC ....... *H04N 1/32767* (2013.01); *H04N 1/0049* (2013.01); *H04N 1/00244* (2013.01); *H04N 1/00477* (2013.01); *H04N 1/00925* (2013.01); *H04N 2201/0094* (2013.01)

(58) Field of Classification Search
CPC .......... H04N 1/32767; H04N 1/00244; H04N 1/00477; H04N 1/0049; H04N 1/00925; H04N 2201/0094
USPC ....................................................... 358/1.14
See application file for complete search history.

(56) References Cited

U.S. PATENT DOCUMENTS

| | | | |
|---|---|---|---|
| 2004/0233474 A1 | 11/2004 | Watanabe | |
| 2009/0089457 A1 | 4/2009 | Zhan | |
| 2010/0088609 A1 | 4/2010 | Kawana | |
| 2017/0090830 A1* | 3/2017 | Tomono | ................ G06F 3/1285 |

FOREIGN PATENT DOCUMENTS

| | | |
|---|---|---|
| JP | 2004-345203 A | 12/2004 |
| JP | 2009-104586 A | 5/2009 |
| JP | 2010-93532 A | 4/2010 |

* cited by examiner

*Primary Examiner* — Mark R Milia
(74) *Attorney, Agent, or Firm* — Scully, Scott, Murphy & Presser, P.C.

(57) ABSTRACT

An image processing device includes a communication interface, an operation interface, and a controller. The communication interface is configured to communicate with a server. In a case that an agreement is not established for subscription service using the server, the controller performs an operation disabling process to disable a specific operation using the operation interface. The specific operation is to cause the communication interface to communicate with the server. In a case that the agreement is established, the controller performs an operation enabling process to enable the specific operation using the operation interface.

15 Claims, 8 Drawing Sheets

IMAGE PROCESSING DEVICE DISABLING SPECIFIC OPERATION TO CAUSE COMMUNICATION INTERFACE TO COMMUNICATE WITH SERVER

CROSS REFERENCE TO RELATED APPLICATION

This application claims priority from Japanese Patent Application No. 2020-165327 filed Sep. 30, 2020. The entire content of the priority application is incorporated herein by reference.

TECHNICAL FIELD

The present disclosure relates to an image processing device to processes an image, and an image processing program.

BACKGROUND

In a conventional network printing system, a printer is provided with a "Connect" button for connecting the printer to a host computer.

SUMMARY

In recent years, a user of an image processing device may enter a subscription agreement with a service provider that sells the image-processing devices to pay the service provider a fee based on printing content. In a case that the user has entered such a subscription agreement, the image processing device preferably establishes a continuous connection with a server over a network and periodically communicates with the server. In a case that the image-processing device is disconnected from the server, the image-processing device must be able to reconnect quickly. Therefore, it is conceivable that a "Connect" button may be provided on an image-processing device covered under such subscription agreements.

However, since the image-processing device need not be connected to the server before the user has entered a subscription agreement in the above scenario, providing a "Connect" button could lead to adverse effects, such as needless communications, and unexpected and erroneous user operations.

In view of the foregoing, it is an object of the present disclosure to provide an image processing device and an image processing program capable of preventing needless communications, and unexpected and erroneous user operations by only allowing the image processing device to be connected to the server when necessary.

In order to attain the above and other objects, the disclosure provides an image processing device. The image processing device includes a communication interface, an operation interface, and a controller. The communication interface is configured to communicate with a server. The controller is configured to perform: in a case that an agreement is not established for subscription service using the server, an operation disabling process to disable a specific operation using the operation interface, the specific operation being to cause the communication interface to communicate with the server; and in a case that the agreement is established, an operation enabling process to enable the specific operation using the operation interface.

According to another aspect, the disclosure provides a non-transitory computer readable storage medium storing a set of program instructions installed on and executed by a computer included in an image processing device. The image processing device further includes: a communication interface configured to communicate with a server; and an operation interface. The set of program instructions includes: in a case that an agreement is not established for subscription service using the server, performing an operation disabling process to disable a specific operation using the operation interface, the specific operation being to cause the communication interface to communicate with the server; and in a case that the agreement is established, performing an operation enabling process to enable the specific operation using the operation interface.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
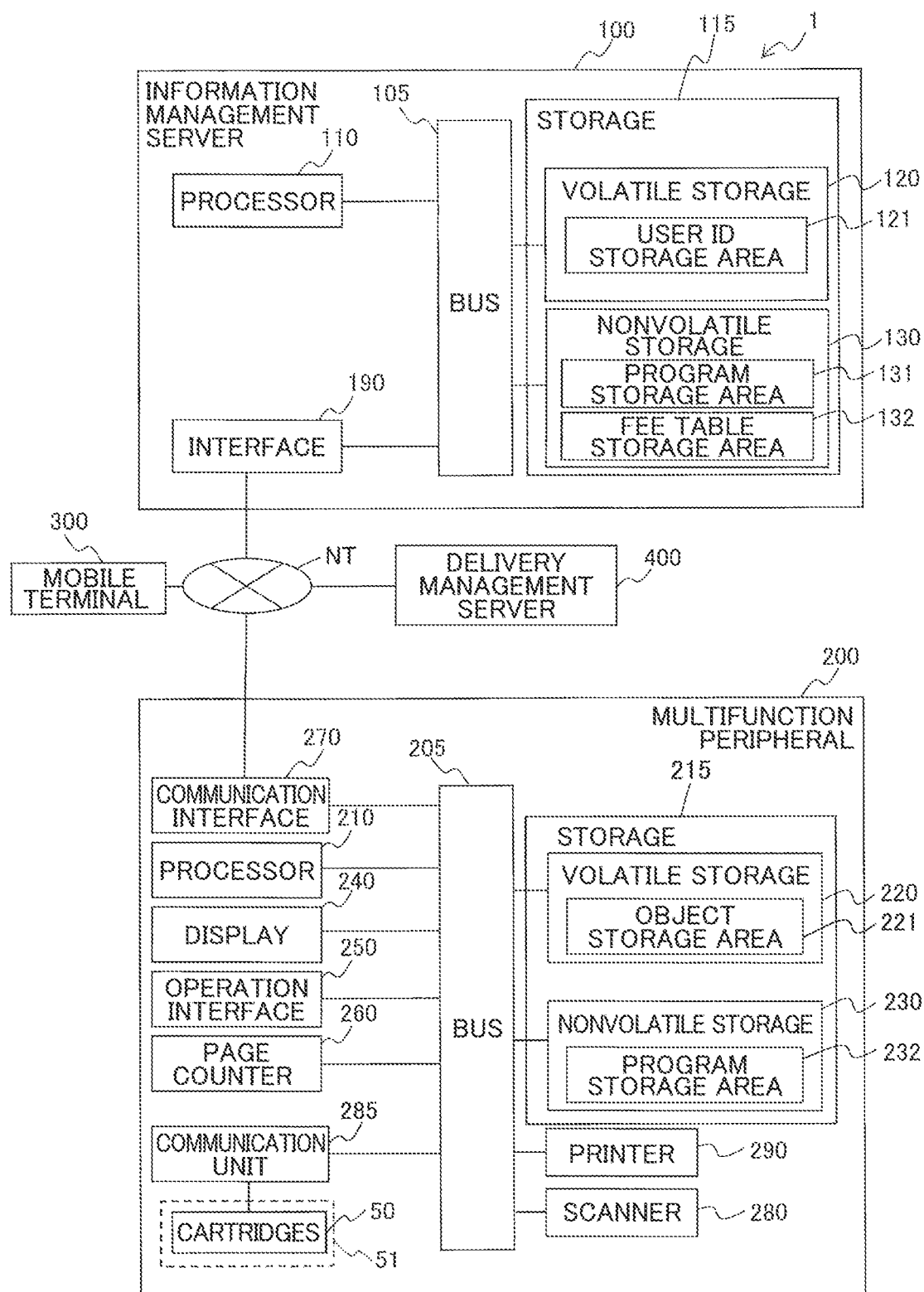
FIG. 1 is a block diagram illustrating overall structures of a printing system according to an embodiment.

FIG. 1 shows a printing system according to an embodiment of the present invention. In the embodiment, a printing system 1 can enforce a contract in which a user, i.e., a customer, is provided a service using a server. More specifically, the printing system 1 can enforce a printing agreement, also known as a subscription, in which the user pays a fee to use the printing function of a multifunction peripheral 200.

Overview of the Printing System

As shown in FIG. 1, the printing system 1 includes an information management server 100, the multifunction peripheral 200, a mobile terminal 300, and a delivery management server 400. The information management server 100, the multifunction peripheral 200, the mobile terminal 300, and the delivery management server 400 are interconnected over a network NT and are capable of communicating with each other. The multifunction peripheral 200 is an example of the printing device.

Information Management Server

The information management server 100 is installed and managed by the manufacturer of the multifunction peripheral 200, for example. The information management server 100 has a processor 110, a storage 115, and an interface 190. The processor 110, the storage 115, and the interface 190 are interconnected via a bus 105. The information management server 100 is an example of the server.

The storage 115 is provided with a volatile storage 120, and a nonvolatile storage 130. The volatile storage 120 is DRAM, for example, and has a user ID storage area 121. The volatile storage 120 saves a subscription page count received from the multifunction peripheral 200. The nonvolatile storage 130 is a hard disk drive or solid-state drive, for example. The nonvolatile storage 130 has a program storage area 131, and a fee table storage area 132.

The fee table storage area 132 stores prescribed correlations for calculating fees to be charged to the user based on printing. These correlations indicate the rates per page count based on printing coverage, paper size, and whether printing was performed in color or monochrome, for example.

The processor 110 is a device that performs data processing, such as a CPU. By executing a program stored in the program storage area 131, the processor 110 implements various processes, such as those in FIGS. 2, 7, and 9 described later, including a process for performing data communications with the mobile terminal 300, the multifunction peripheral 200, and the delivery management server 400 connected to the network NT.

The interface 190 is a wired LAN interface or wireless interface for communicating with other devices. The interface 190 is connected to the network NT.

Delivery Management Server

The delivery management server 400 is installed at a company providing a delivery service for delivering various articles, for example. Although not shown in the drawings, the delivery management server 400 has a processor, a storage, and an interface for connecting to the network NT.

Multifunction Peripheral

The multifunction peripheral 200 may be a printer, a facsimile machine, or the like that the service provider owns, for example. The service provider may lend the multifunction peripheral 200 to the user, and the user installs the multifunction peripheral 200 at home. The multifunction peripheral 200 has a scanner 280, a printer 290, a processor 210, a storage 215, a display 240, an operation interface 250, a page counter 260, a communication unit 285, and a communication interface 270. The scanner 280, the printer 290, the processor 210, the storage 215, the display 240, the operation interface 250, the page counter 260, the communication unit 285, and the communication interface 270 are connected to each other via a bus 205. By using the communication interface 270, the multifunction peripheral can communicate with the information management server 100 via the network NT. The communication interface 270 is an example of a communication interface.

The storage 215 includes a volatile storage 220, and a nonvolatile storage 230. The volatile storage 220 is DRAM, for example, and provided with an object storage area 221 described later. The nonvolatile storage 230 is flash memory, for example. The nonvolatile storage 230 is provided with a program storage area 232. The program storage area 232 stores various programs including an image processing program according to the embodiment for executing the sequence steps in FIGS. 2, 6, 7, 8, and etc. The image processing program is prestored in the nonvolatile storage 230 as firmware, for example.

The processor 210 is a device such as a CPU that performs data processing. The processor 210 is an example of the controller. The processor 210 executes the image processing program stored in the program storage area 232 and, in cooperation with the processor 110, implements an image processing method according to the printing system 1 of the embodiment.

The display 240 is a liquid crystal display, for example. The operation interface 250 is a device that receives user operations. By operating the operation interface 250, the user can input various instructions into the multifunction peripheral 200. The communication interface 270 is a wired or wireless network interface for communicating with other devices. The communication interface 270 is connected to the network NT. In the embodiment, the display 240 is configured as a touchscreen having a function of the operation interface 250. This touchscreen is provided in an operation panel of the multifunction peripheral 200. Hereinafter, the touchscreen 240 is referred for indicating the display 240 having the function of the operation interface 250.

The scanner 280 optically reads an original or other object using photoelectric conversion elements such as a CCD or CMOS and generates scan data representing the read image.

The printer 290 feeds a sheet of paper from a paper tray and conveys the sheet with a conveying mechanism (not shown) while printing an image on the conveyed sheet according to a prescribed method. A case in which an inkjet system is used for printing will be taken up in the following description. Hence, the printer 290 forms images on paper using ink stored in ink cartridges 50 that are detachably mounted in a cartridge holder 51. The printer 290 is an example of a recording portion; the paper is an example of the printing medium; the ink cartridges 50 are an example of the cartridges; the cartridge holder 51 is an example of the cartridge mount portion; and the ink is an example of the cartridge. More specifically, the ink cartridges 50 include a cyan ink cartridge a magenta ink cartridge, a yellow ink cartridge, and a black ink cartridge. However, when no distinction is being made, the cartridges will simply be called "ink cartridges 50" in the following description for convenience.

The communication unit 285 is a terminal, for example, that is electrically connected to a cartridge memory (a chip) possessed by each ink cartridge 50 mounted in the cartridge holder 51. The multifunction peripheral 200 of the embodiment can be used in a printing service offered under a prescribed printing agreement. An ink cartridge 50 that is used based on such an agreement (hereinafter simply referred to as a "subscription cartridge 50") has different specifications from an ordinary ink cartridge 50 purchased for use in the multifunction peripheral 200 by the owner of the multifunction peripheral 200, for example (hereinafter simply referred to as a "normal cartridge 50"). For this reason, each ink cartridge 50 is provided with a cartridge memory (not shown) for storing cartridge information. The cartridge information includes cartridge type information indicating whether the ink cartridge 50 is a subscription cartridge 50 or a normal cartridge 50. The processor 210 acquires this cartridge information from the cartridge memory of each ink cartridge 50 via the communication unit 285. Based on the acquired cartridge information, the processor 210 can identify whether each ink cartridge 50 mounted in the cartridge holder 51 is a subscription cartridge 50 or a normal cartridge 50.

The page counter 260 has a function for incrementing or counting up a cumulative value of a printing count when the printer 290 executes a print under control of the processor 210. The printing count is more specifically the number of printed pages. For example, the page counter 260 counts one page every time the printer 290 prints one side of a single sheet of paper and counts two pages every time the printer 290 prints on both sides of a sheet. This page count is set to zero when the multifunction peripheral 200 is manufactured and shipped, for example, and thereafter is incremented without exception each time a print is performed. By controlling the page counter 260 to count pages and acquiring this page count from the page counter 260, the processor 210 can perform various processes.

Mobile Terminal

The mobile terminal 300 is an information terminal such as a smartphone or other mobile device possessed by the user. The mobile terminal 300 is connected to the network NT through wireless communications. While not shown in the drawings, the mobile terminal 300 has a processor, a storage, and an interface for connecting to the network NT. Alternatively, another information terminal such as a personal computer or a tablet computer may be used in place of the mobile terminal 300. In the following description, the information terminal such as the mobile terminal 300 or the personal computer will be generally called the "information terminal 300."

Features of the Embodiment

The features of the printing system 1 according to the embodiment having the above configuration involve the operations performed for connecting the multifunction peripheral 200 to the information management server 100, and the screens that are displayed in relation to those operations and the connection status.

More specifically, when the user has entered a printing agreement, such as a subscription plan, it is preferable for the multifunction peripheral 200 to be continuously connected with the information management server 100 via the network NT. In a case that the connection is lost, the multifunction peripheral 200 must be able to reconnect quickly. One possible solution is to provide the multifunction peripheral 200 with a "Connect" button or the like that the user can operate to connect the multifunction peripheral 200 to the information management server 100. However, since there is no need for the multifunction peripheral 200 to connect to the information management server 100 before a printing agreement is established, the provision of a "Connect" button could lead to the occurrence of needless communications, the user performing erroneous operations unexpectedly, or other adverse effects.

Process Flow

Therefore, the embodiment provides a control procedure for resolving this problem. The control procedure represents processes executed by the processor 210 of the multifunction peripheral 200, the processor 110 of the information management server 100, the processor of the delivery management server 400, and the processor of the information terminal 300. This control procedure will be described next with reference to the sequence chart of FIG. 2. In the following descriptions for FIG. 2 and other drawings, the processors have been omitted from the descriptions. Hence, expressions such as "the processor of the multifunction peripheral 200 executes" or "by the processor of the multifunction peripheral 200" have been simplified to "the multifunction peripheral 200 executes" and "by the multifunction peripheral 200."

Figure 2:
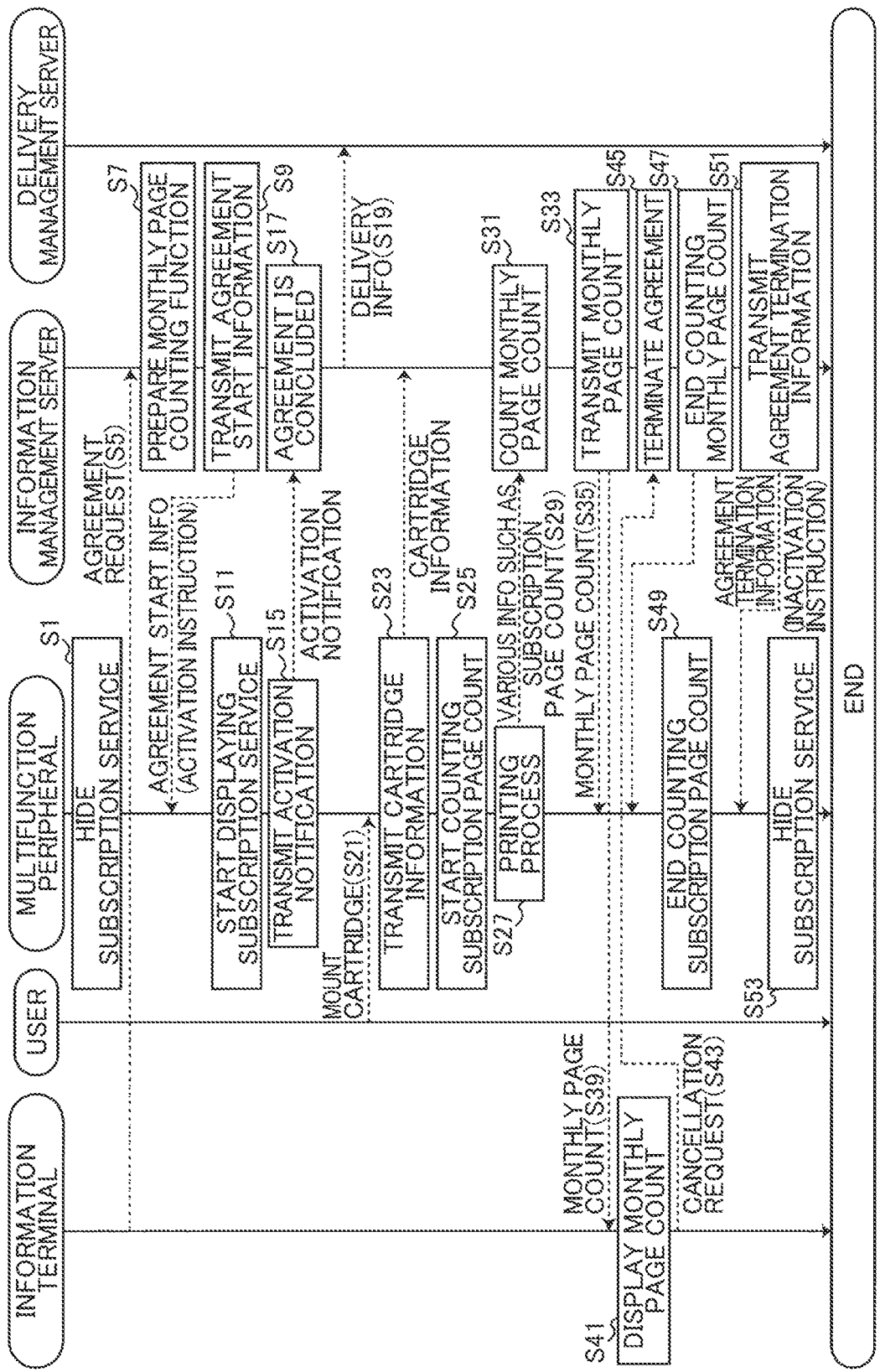
FIG. 2 is a sequence chart illustrating processes executed by an information terminal, a multifunction peripheral, an information management server, and a delivery management server.
Figure 3:
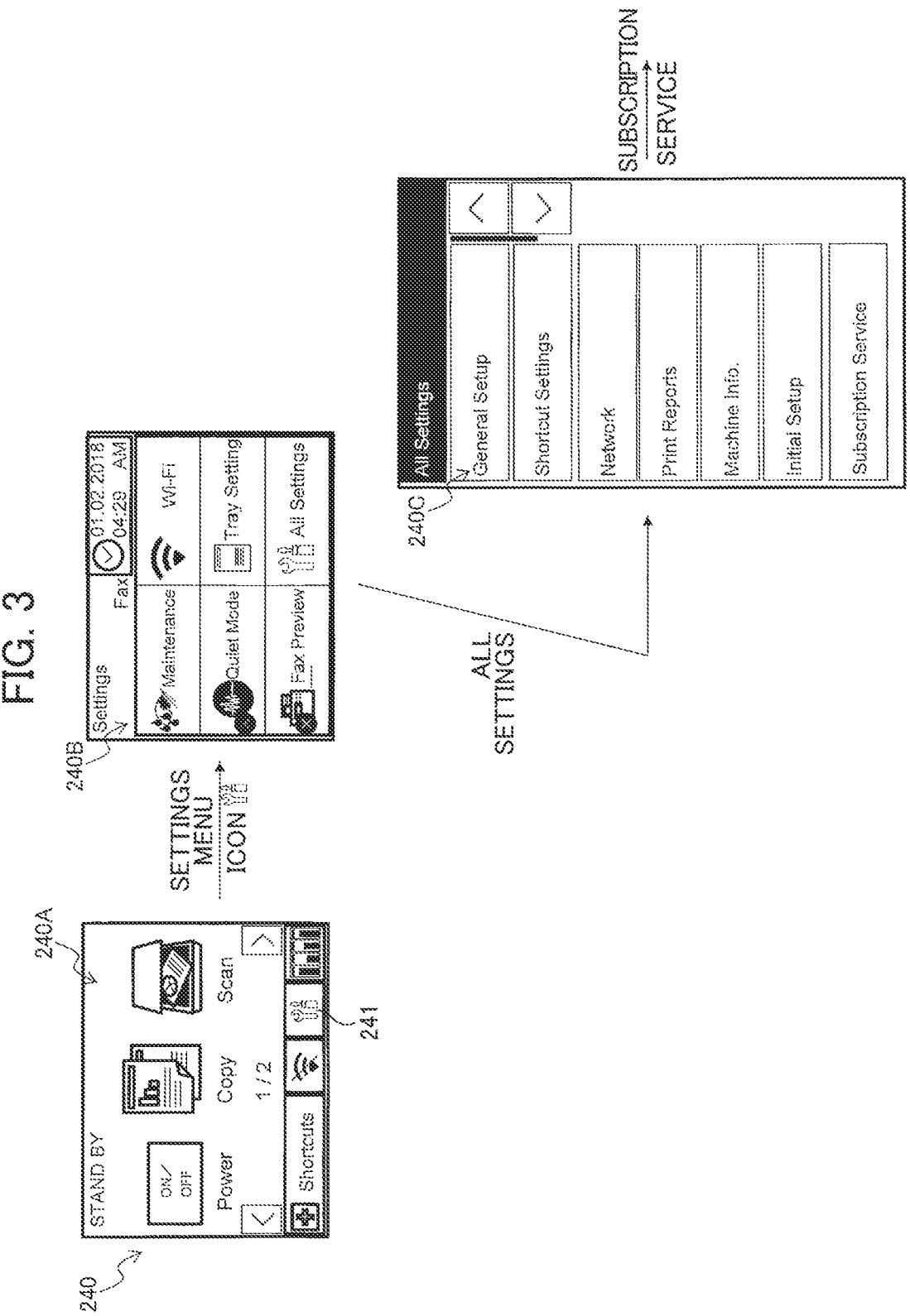
FIG. 3 is an explanatory diagram illustrating operations and transition of a touchscreen in a multifunction peripheral after a printing agreement is established.

In S1 of FIG. 2, the processor 210 of the multifunction peripheral 200 hides a "Subscription Service" button on the touchscreen 240. When the multifunction peripheral 200 does not hide the "Subscription Service" button, the user can display the "Subscription Service" button by performing a prescribed operation on the touchscreen 240. This process will be described next in greater detail with reference to FIG. 3. FIG. 3 shows sample content displayed on the touchscreen 240.

Sequence of Screens Displayed on the Touchscreen

FIG. 3 shows a sequence of screens displayed on the touchscreen 240 and the operations performed on the touchscreen 240 to switch displays in a case that the "Subscription Service" button is not hidden, i.e., after a printing agreement described later has been established. While the power supply to the multifunction peripheral 200 is on, first an idle screen 240A is displayed on the touchscreen 240 as the initial screen. The idle screen 240A includes icons representing a menu of various operations including "Fax," "Copy," and "Scan." The idle screen 240A also includes a "Setting Menu" icon 241." By operating the "Settings Menu" icon 241 in the idle screen 240A, the user can display a settings screen 240B.

The settings screen 240B includes buttons displaying items for which settings are configurable. These items are "Maintenance," "Wi-fi" (registered trademark), "Quiet Mode," "Tray Setting," "Fax Preview," and "All Settings." By operating the "All Settings" button in the settings screen 240B, the user can display an advanced settings screen 240C.

The advanced settings screen 240C includes the item name "General Setup," "Shortcut Settings," "Network," "Print Reports," "Machine Info.," "Initial Setup," and "Subscription Service."

Note that at a time that the process of S1 is performed, a printing agreement has not yet been established, and either normal cartridges 50 or no ink cartridges 50 are currently mounted in the cartridge holder 51. At this time, the "Subscription Service" button is grayed out so as to be hidden and is inoperable, as in the example shown in FIG. 4.

Figure 5:
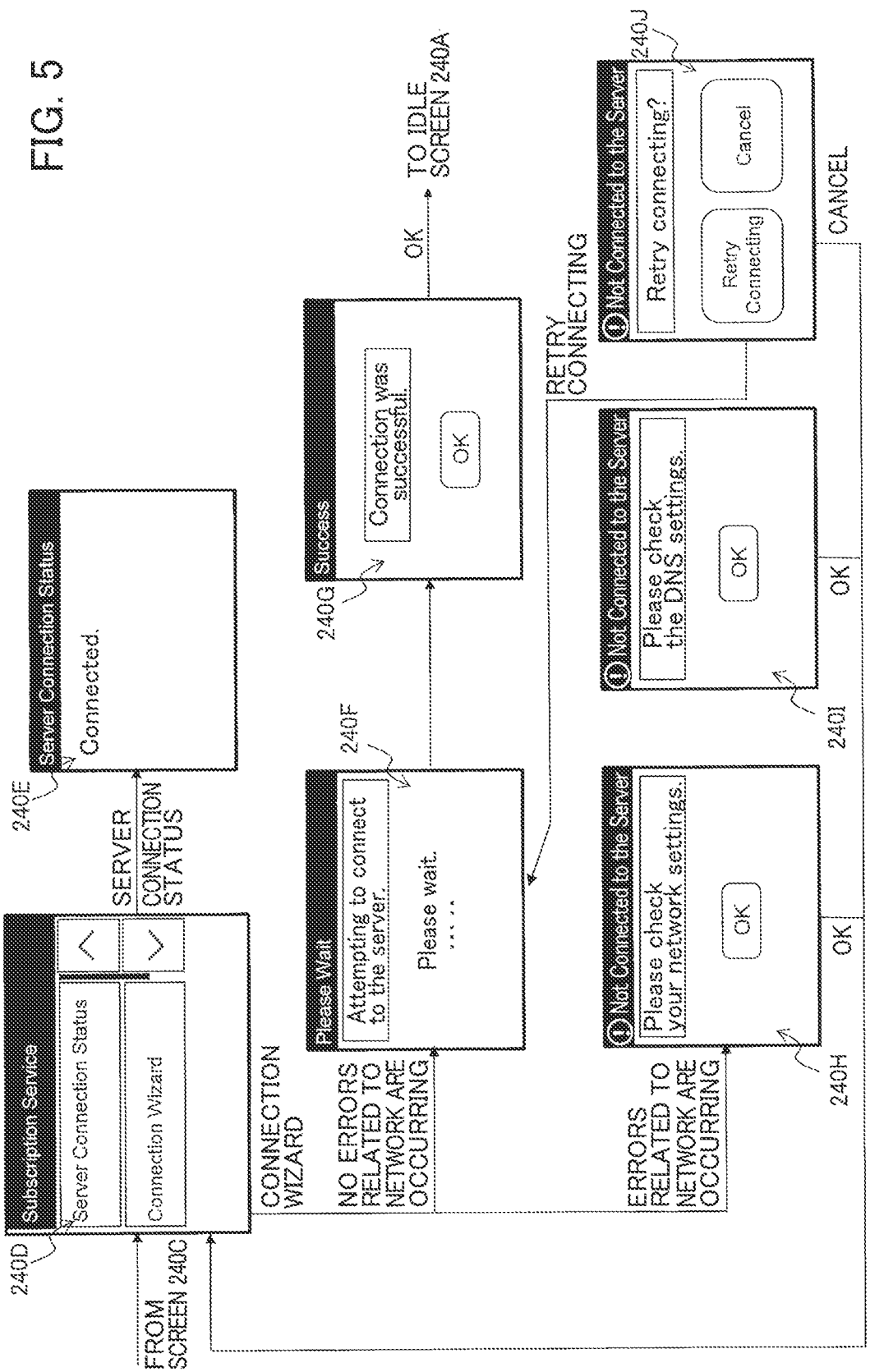
FIG. 5 is an explanatory diagram illustrating operations and transition of the touchscreen after the printing agreement is established.

Here, the purpose of the "Subscription Service" button and the purpose of hiding the button will be described with reference to FIG. 5. FIG. 5 shows sequences of screens that may be displayed in a case that the "Subscription Service" button is operated in the advanced settings screen 240C shown in FIG. 3.

When the user operates the "Subscription Service" button in the advanced settings screen 240C of FIG. 3, a service display screen 240D is displayed as shown in FIG. 5. The "Subscription Service" button is an example of the third object and also an example of the access button.

Buttons provided in the service display screen 240D for selecting displayable items are a "Server Connection Status" button and a "Connection Wizard" button. The "Server Connection Status" button is provided for displaying the connection status of the multifunction peripheral 200. The connection status indicates whether the multifunction peripheral 200 and the information management server 100 can currently communicate with each other. The "Connection Wizard" button is provided for attempting to connect the multifunction peripheral 200 to the information management server 100. Here, the processor 210 displays the "Connection Wizard" button as well as other buttons in the various screens displayed on the touchscreen 240 using button display data that has been stored in the object storage area 221 of the storage device 215. This button display data is an example of the display data.

By operating the "Server Connection Status" button in the service display screen 240D, the user can display a status display screen 240E. In a case that the connection status is such that the multifunction peripheral 200 and the information management server 100 are connected and capable of communicating with each other, the status display screen 240E displays "Connected," as shown in FIG. 5. This "Connected" text is an example of the second object and also an example of the connection status display. Further, the process executed by the processor 210 to display this text on the display 240 is an example of the second object display process and also an example of the connection display process. However, when the multifunction peripheral 200 and the information management server 100 are in a non-connected state and incapable of communicating with each other, the processor 210 displays "Connection failure" (not shown). Note that this "Connected" text or the "Connection failure" text may be displayed together within the "Server Connection Status" button in the service display screen 240D.

On the other hand, in a case that the user operates the "Connection Wizard" button in the service display screen 240D, the display shifts to a connection attempt display screen 240F, provided that no particular errors related to the network NT are occurring at this time. The "Connection Wizard" button is an example of the first object. While displaying the connection attempt display screen 240F, the processor 210 attempts to connect the multifunction peripheral 200 to the information management server 100 over the network NT. The connection attempt display screen 240F includes the item name "Please wait" and the messages "Attempting to connect to the server" and "Please wait."

When the processor 210 subsequently succeeds in connecting the multifunction peripheral 200 to the information management server 100, the display shifts to a connection success display screen 240G. The connection success display screen 240G includes the item name "Success," the message "Connection was successful," and an "OK" button. After confirming that the connection attempt was successful, the user operates the "OK" button, and the display on the touchscreen 240 is returned to the idle screen 240A described above.

Note that in a case that the multifunction peripheral 200 is experiencing some kind of error related to the network NT and the user operates the "Connection Wizard" button in the service display screen 240D, the display on the display 240 shifts to one of three error handling display screens 240H, 240I, and 240J.

Specifically, in a case that the processor 210 identifies some problem with a DNS setting, the display changes to the error handling display screen 240I. In a case that the processor 210 identifies some problem with a network setting other than the DNS setting, the display changes to the error handling display screen 240H. In a case that errors other than those described above, the display changes to the error handling display screen 240J.

The error handling display screen 240H includes the item name "Not connected to the server," the message "Please check your network settings," and an "OK" button. Upon viewing this displayed content, the user makes necessary modifications to the network settings and then operates the "OK" button, for example. At this time, the display on the touchscreen 240 returns to the service display screen 240D described above.

The error handling display screen 240I includes the item name "Not connected to the server," the message "Please check the DNS settings," and an "OK" button. Upon viewing the displayed content, the user makes any necessary changes to the DNS settings and operates the "OK" button, at which time the display on the touchscreen 240 returns to the service display screen 240D.

The error handling display screen 240J includes the item name "Not connected to the server," the message "Retry connecting?" a "Retry Connecting" button, and a "Cancel" button. When the user wishes to reconnect, i.e., retry connecting the multifunction peripheral 200 to the information management server 100, the user operates the "Retry Connecting" button, and the display on the touchscreen 240 changes to the connection attempt display screen 240F described above. In response to this operation, the processor 210 once again attempts to connect the multifunction peripheral 200 to the information management server 100 as described above. The "Retry Connecting" button and the "Connection Wizard" button are examples of the reconnection buttons, and also examples of the reconnection command units. Operations on the "Subscription Service" button in the advanced settings screen 240C, the "Connection Wizard" button in the service display screen 240D, and the "Retry Connecting" button in the error handling display screen 240J are examples of the specific operation.

However, when the user does not wish to retry connecting, the user operates the "Cancel" button and the display on the touchscreen 240 is returned to the service display screen 240D described above.

While not shown in the drawings, error handling display screens other than the error handling display screens 240H and 240I described above may be provided. For example, an error handling display screen (not shown) may be provided for server setting errors, for example. Additionally, an error handling display screen (not shown) may be provided to handle cases in which an inputted PIN code for an agreement does not match the code stored on the information management server 100.

Purpose of Hiding the Subscription Service Button

Returning to FIG. 2, in S1 the multifunction peripheral 200 hides the "Subscription Service" button so that the button is inoperable (see FIG. 4), as described above. Accordingly, the user cannot perform any specific operation described above. That is, the user can operate none of the "Subscription Service" button, and the "Server Connection Status" button and the "Connection Wizard" button displayed in the subsequent service display screen 240D.

More particularly, the display on the touchscreen 240 cannot be changed to any of the screens 240D, 240E, 240F, 240G, 240H, 240I, or 240J shown in FIG. 5. In other words, the user cannot access any information related to the printing agreement described above that is displayed in the screens 240D-240J of FIG. 5, including the "Connection Wizard" button, which all begin from the operation of the "Subscription Service" button. In particular, the user cannot access the "Connection Wizard" button and the "Server Connection Status" button in the service display screen 240D, the "Connected" text in the status display screen 240E, and the "Retry Connecting" button in the error handling display screen 240J, all of which are made possible by the operation of the "Subscription Service" button.

As a result of the above description, step S1 is an example of the operation disabling step. Further, the process executed by the processor 210 in S1 is an example of the operation disabling process, and also an example of the third object disabling process and an example of the access button disabling process.

Establishing a Printing Agreement

Returning to FIG. 2, after the process in S1 has been completed as described above, the user performs a prescribed operation on the information terminal 300 indicating an intention to use the multifunction peripheral 200 under the printing agreement described above. In response to this operation, in S5 the information terminal 300 transmits an agreement request to the information management server 100, and thus the information management server 100 receives the agreement request.

In response, in S7 the information management server 100 prepares a monthly page counting function based on the page count held by the page counter 260 in the multifunction peripheral 200. This monthly page counting function counts only pages properly printed according to the printing agreement from among the number of pages counted by the page counter 260 during every specific interval after the printing agreement has been established. In the embodiment, the specific interval is one month, and the number of pages printed for each month (hereinafter simply called the "monthly page count") is counted as an example of the printing count for the specific interval. The monthly page counting function is provided in the information management server 100 in association with the user ID corresponding to the information terminal 300.

In S9 the information management server 100 transmits agreement start information (i.e., an activation instruction) to the multifunction peripheral 200, and the multifunction peripheral 200 receives this activation instruction. Through this action, the printing agreement described above is now established. The agreement start information is an example of the printing agreement completion notification.

Displaying the "Subscription Service" Button

Figure 4:
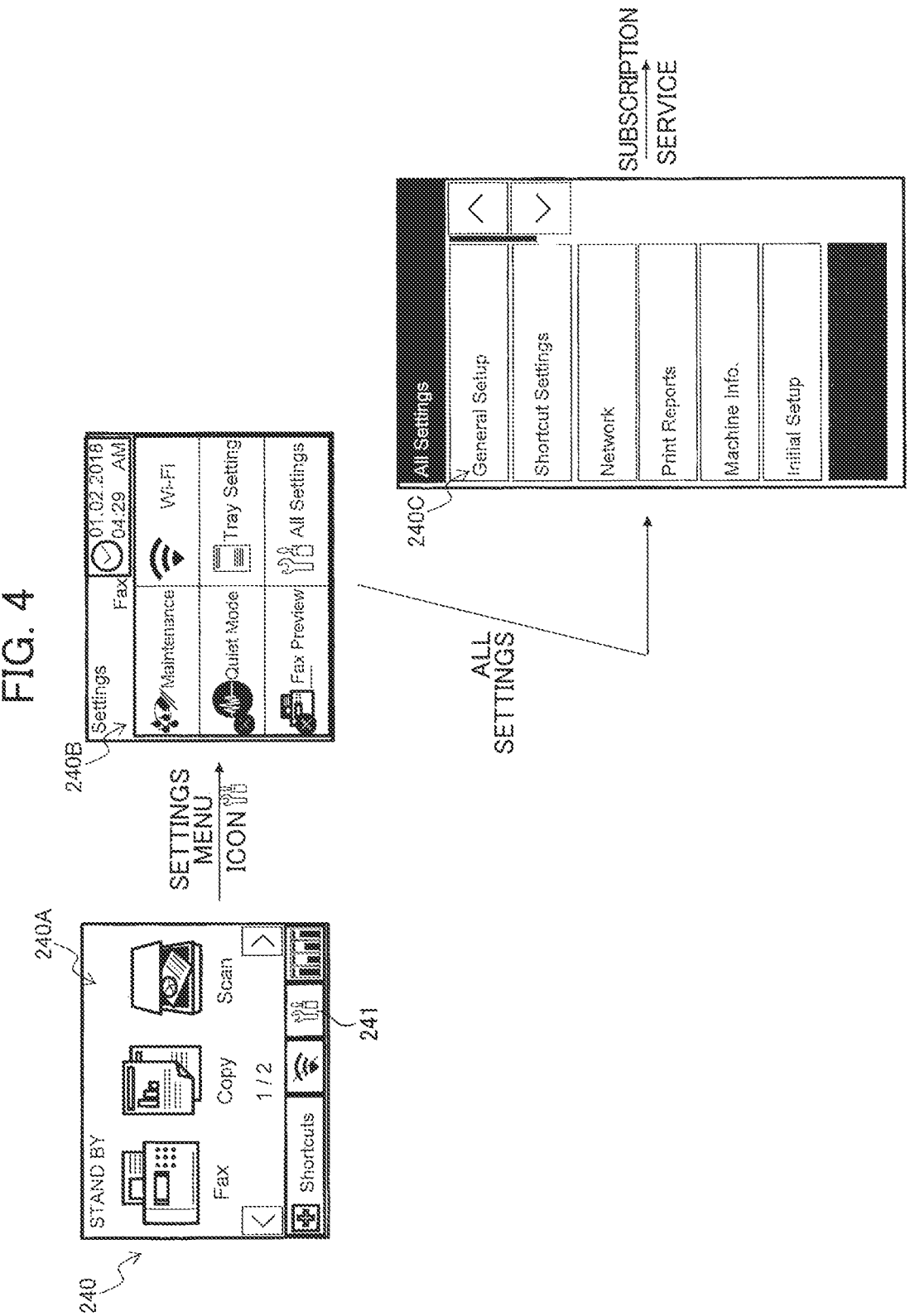
FIG. 4 is an explanatory diagram illustrating operations and transition of the touchscreen before the printing agreement is established.

In response to an agreement being established, in S11 the multifunction peripheral 200 switches from the mode of screen transitions on the touchscreen 240 shown in FIG. 4 to the mode of screen transitions shown in FIG. 3. Thus, in S11 the processor 210 stops hiding the "Subscription Service" button and displays the "Subscription Service" button clearly in the advanced settings screen 240C. As a result, the user can switch to the various screens 240D, 240E, 240F, 240G, 240H, 240I, and 240J through the corresponding operations described with reference to FIG. 5. Specifically, once the "Subscription Service" button is operated, the user can access information related to the printing agreement displayed in the screens 240D-240J in FIG. 5, including the "Connection Wizard" button.

In particular, the user can perform the specific operations described above, which is an operation of the "Subscription Service" button and an operation of the "Connection Wizard" button in the subsequent service display screen 240D. Further, owing to the operation of the "Subscription Service" button, the user can access the "Connection Wizard" button and the "Server Connection Status" button in the service display screen 240D, the "Connected" display in the status display screen 240E, and the "Retry Connecting" button in the error handling display screen 240J.

Note that, rather than hiding the "Subscription Service" button in S1 described above, the display of the "Subscription Service" button may be eliminated from the advanced settings screen 240C without even allocating space for the button. In this case, in S11 the processor 210 provides extra space in the advanced settings screen 240C for the "Subscription Service" button and displays the "Subscription Service" button in the new space.

According to the above description, step S11 is an example of the operation enabling step. Further, the process executed by the processor 210 in S11 is an example of the operation enabling process, an example of the third object enabling process, and an example of the access button enabling process.

After the process of S11, in S15 the multifunction peripheral 200 transmits an agreement acceptance notification (i.e., an activation notification) to the information management server 100, and in S17 the information management server 100 receives this activation notification. Here, the information management server 100 may issue a query to the multifunction peripheral 200, and the multifunction peripheral 200 may transmit the activation notification in response. In this way, the information management server 100 recognizes that the printing agreement described above has been concluded. Thereafter, the multifunction peripheral 200 establishes communications with the information management server 100 to periodically exchange information related to the service. In the embodiment, the information management server 100 manages information necessary for the service according to the agreement by communicating with the multifunction peripheral 200 and exchanging information every 12 hours. In S19 the information management server 100 transmits delivery information to the delivery management server 400 for delivering subscription ink cartridge(s) 50 to the user. Through this process, the company providing a delivery service ships subscription ink cartridge(s) 50 to the user. Since the subscription cartridges 50 are used to perform printing processes on the multifunction peripheral 200 according to S27 described later, the multifunction peripheral 200 uses a well-known method to detect whether ink in the subscription cartridges 50 has been depleted or is getting low. The information management server 100 follows the reduction in residual ink quantities through the periodic communications described above. When the information management server 100 grasps that the residual ink quantity (or quantities) for an ink cartridge(s) 50 becomes (or become) low, the information management server 100 transmits delivery information to the delivery management server 400 for delivering additional ink cartridge(s) 50 to the user, as in S19 described above. In this way, the user can simply use the multifunction peripheral 200 without having to worry about managing residual ink quantities in the ink cartridges 50.

After the user receives subscription cartridge(s) 50 that was (or were) shipped as described above, in S21 the user mounts the subscription cartridge(s) 50 in the cartridge holder 51 of the multifunction peripheral 200. At this time, the communication unit 285 acquires cartridge information for the mounted ink cartridge(s) 50. In S23 the multifunction peripheral 200 transmits the acquired cartridge information to the information management server 100. In response, the information management server 100 receives the transmitted cartridge information.

In S25 the multifunction peripheral 200 starts counting with a subscription counting function based on the page count kept by the page counter 260. This subscription counting function counts only the number of pages that are printed properly in accordance with the printing agreement from among all pages counted by the page counter 260 after the printing agreement was established. For example, the subscription counting function excludes counts of pages printed when performing a test print, when only a single side of the sheet could be printed under an agreement for duplex printing, and when misprints occur due to an issue on the multifunction peripheral 200, such as a sheet conveying problem. Hereinafter, the number of printed pages counted by this subscription counting function will be called the "subscription page count."

In S27 the printer 290 executes a printing process on the multifunction peripheral 200. When the page counter 260 increments the page count at this time, the subscription page count is similarly incremented for pages that were printed properly in accordance with the printing agreement. In S29 the multifunction peripheral 200 transmits various information including the subscription page count to the information management server 100.

In S31 the information management server 100 uses the monthly page counting function prepared in S7 to count the monthly page count based on the subscription page count received from the multifunction peripheral 200. Next, counting of the monthly page count will be described in greater detail. As described above, the information management server 100 periodically communicates with the multifunction peripheral 200 to exchange information. In this example, the periodic cycle is every 12 hours. The information management server 100 saves in the volatile storage 120 the subscription page count received from the multifunction peripheral 200 every periodic communication. Further, the information management server 100 updates the monthly page count for every specific interval, which is one month in this example. Hence, the information management server 100 resets the monthly page count to zero every month. The information management server 100 compares the subscription page count received from the multifunction peripheral 200 via a periodic communication (communication of periodic cycle (12 hours)) after the monthly page count was reset with the subscription page count received from the multifunction peripheral 200 just prior to resetting the monthly page count, and stores this difference as the current monthly page count. The information management server 100 repeats this process until the end of the specific interval, i.e., throughout the one-month period. In this way, the user can be aware of the latest monthly page count, which is updated every 12 hours through the periodic communications. Thus, the monthly page count is the number of pages printed during the current month. While the specific interval is set to one month in the embodiment in order to display the number of pages printed based on a monthly fee, the specific interval may be two months or one week, for example. In other words, the period may be adjusted appropriately for the form of service being offered. Further, while the periodic communications for updating the monthly page count are performed every 12 hours in the embodiment, the periodic communications may be performed on another cycle, such as every other day. Alternatively, updating the subscription page count may be performed at an irregular timing, such as after every printing operation.

In S33 the information management server 100 transmits the monthly page count counted in S31 to the multifunction peripheral 200, and in S35 the multifunction peripheral 200 receives/acquires this monthly page count.

In S33 the information management server 100 also transmits the monthly page count found in S31 to the information terminal 300, and in S39 the information terminal 300 receives/acquires this monthly page count from the information management server 100. Instead of the information management server 100, the multifunction peripheral 200 may transfer the monthly page count from the information management server 100 to the information terminal 300. In S41 the information terminal 300 displays the monthly page count acquired from the information management server 100.

After having completed all desired printing, the user subsequently wishes to cancel the printing agreement described above, the user may perform a prescribed operation on the information terminal 300. In response to the user's operation, in S43 the information terminal 300 transmits a cancellation request to the information management server 100, and in S45 the information management server 100 receives this request. In S47 the information management server 100 ends counting of the monthly page count through the monthly page counting function initiated in S31 and notifies the multifunction peripheral 200 of this cancellation. In response, in S49 the multifunction peripheral 200 ends counting of the subscription page count according to the subscription counting function initiated in S25.

In S51 the information management server 100 then transmits agreement termination information (i.e., an inactivation instruction) to the multifunction peripheral 200, and the multifunction peripheral 200 receives this inactivation instruction. This agreement termination information is an example of the cancellation notification of the agreement. In response, in S53 the multifunction peripheral 200 switches from the mode in which screen transitions on the touchscreen 240 are made as shown in FIG. 3 to the mode in which screen transitions are made as shown in FIG. 4.

Specifically, in S53 the multifunction peripheral 200 again hides the "Subscription Service" button in the advanced settings screen 240C. As a result, the user once again can no longer switch to the various screens 240D, 240E, 240F, 240G, 240H, 240I, and 240J through the various operations described in FIG. 5. Specifically, without being able to operate the "Subscription Service" button, the user cannot access information related to the printing agreement displayed in the screens 240D-240J in FIG. 5, including the "Connection Wizard" button.

Further, the user again cannot perform any specific operation described above, which include an operation of the "Subscription Service" and an operation of the "Connection Wizard" button in the subsequent service display screen 240D. Since the user cannot operate the "Subscription Service" button which can begin display of the screens 240D-240J, the user again cannot access the "Connection Wizard" button in the service display screen 240D, the "Connected" display in the status display screen 240E, and the "Retry Connecting" button in the error handling display screen 240J. The process executed in S53 is an example of the re-disablement process. Subsequently, the sequence in FIG. 2 ends.

Detailed Description of Limited Printing Control on the Multifunction Peripheral While it is assumed that the multifunction peripheral 200 will be connected to the information management server 100 when the multifunction peripheral 200 is used under the printing agreement described above, the embodiment provides an exception in which limited printing is allowed on the multifunction peripheral 200 even when not connected to the information management server 100. Here, a control procedure executed by the processor 210 of the multifunction peripheral 200 to implement this limited printing control will be described with reference to the flowchart in FIG. 6.

Figure 6:
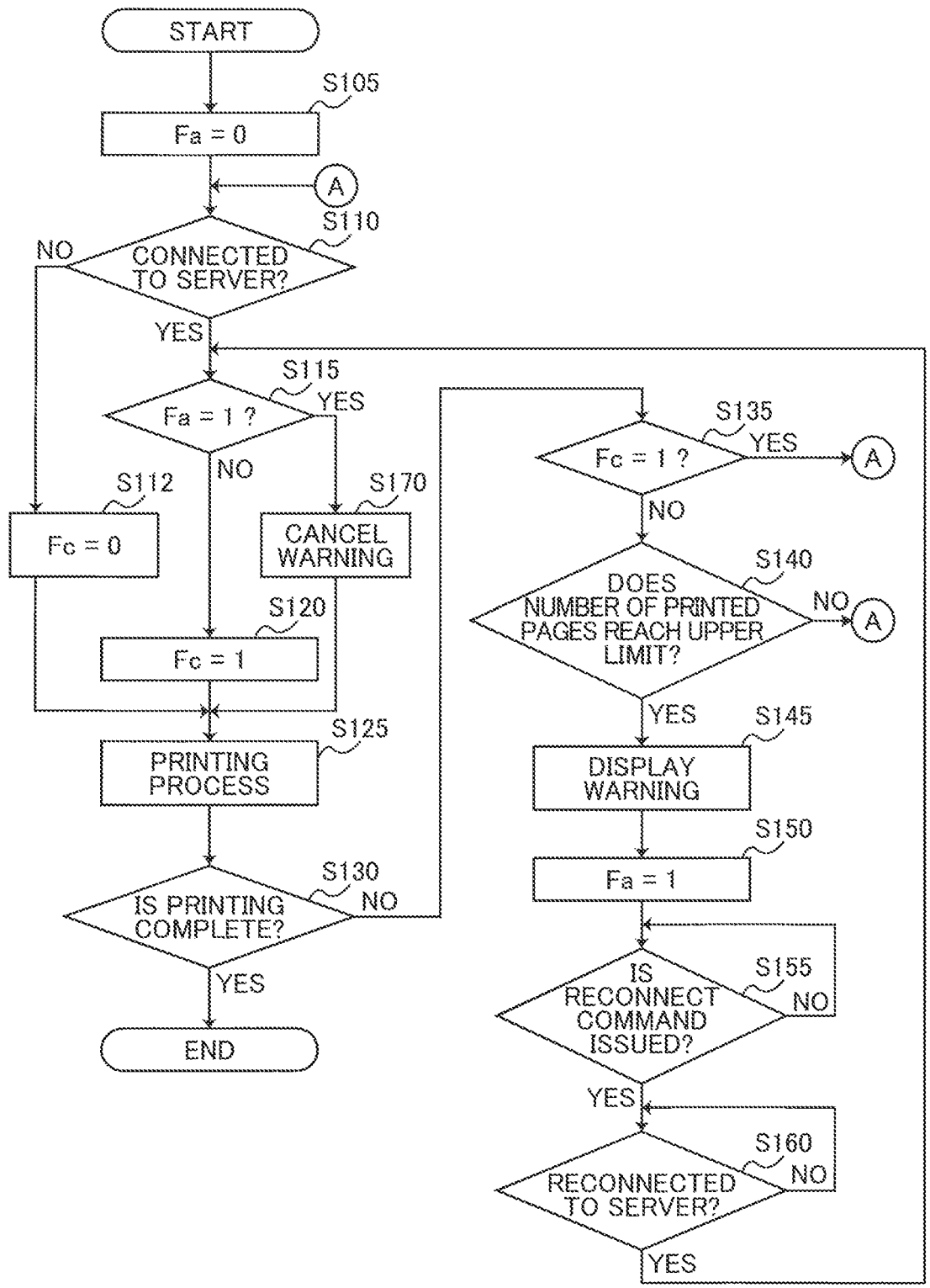
FIG. 6 is a flowchart illustrating a control procedure executed by a processor in the multifunction peripheral to implement a limited printing control.

In S105 at the beginning of the process in FIG. 6, the processor 210 initializes a warning flag Fa to 0. The warning flag Fa is set to 1 when a warning has been issued because the number of printed pages has reached an upper limit described later. In S110 the processor 210 determines whether the multifunction peripheral 200 is currently connected to the information management server 100.

In a case that the multifunction peripheral 200 is not connected to the information management server 100, i.e., is offline (S110: NO), in S112 the processor 210 sets a connection flag Fc to 0 and advances to S125. The connection flag Fc represents the connection status with the information management server 100. However, in a case that the multifunction peripheral 200 is connected to the information management server 100, i.e., is online (S110: YES), in S115 the processor 210 determines whether the warning flag Fa is currently 1.

When the warning flag Fa has not been set to 1 in S150 described later and remains zero (S115: NO), in S120 the processor 210 sets the connection flag Fc to 1 and advances to S125.

In S125 the processor 210 controls the printer 290 to perform a printing process in order to form images on paper. At this time, the processor 210 counts the number of pages printed in the printing process one by one. In S130 the processor 210 determines whether all pages in the printing process specified by the user are complete. When the printing process is complete (S130: YES), the process of FIG. 6 ends. However, when the printing process is not complete (S130: NO), the processor 210 advances to S135.

In S135 the processor 210 determines whether the connection flag Fc is currently 1. In a case that a connection is established between the multifunction peripheral 200 and the information management server 100 so that the connection flag Fc is 1 at this point in time (S135: YES), the processor 210 returns to S110 and repeats the procedure described above. However, in a case that a connection has not been established and the connection flag Fc is currently 0 (S135: NO), in S140 the processor 210 determines whether the number of printed pages counted in S125 has reached a predetermined upper limit. The predetermined upper limit is an upper limit of pages to which the multifunction peripheral 200 can print while the multifunction peripheral 200 is not connected to the information management server 100. In S140 the processor 210 compares the number of printed pages, which was printed while the multifunction peripheral 200 has not been connected to the information management server 100, with the predetermined upper limit. The number of printed pages targeted in this case may calculated based on the monthly page count, the subscription page count, or the page count held by the page counter 260. When the number of printed pages has not reached the upper limit (S140: NO), the processor 210 returns to S110 and repeats the procedure described above. However, when the number of printed pages has reached the upper limit (S140: YES), the processor 210 advances to S145. The process executed by the processor 210 in S140 is an example of the upper limit determination process.

In S145 the processor 210 displays a prescribed warning in a suitable screen on the touchscreen 240 indicating that the number of printed pages has reached the upper limit and that further printing is not permitted. The process executed by the processor 210 in S145 is an example of the warning display process. In S150 the processor 210 sets the warning flag Fa to 1. The screen including the prescribed warning may further includes a button or an icon to issue a reconnect command instructing the multifunction peripheral 200 to attempt to reconnect the multifunction peripheral 200 to the information management server 100.

In S155 the processor 210 determines whether the reconnect command was issued in the above screen on the touchscreen 240 instructing the multifunction peripheral 200 to attempt reconnecting the multifunction peripheral 200 to the information management server 100. The processor 210 repeats the determination in S155 while a reconnect command has not been issued (S155: NO). When a reconnect command was issued (S155: YES), the processor 210 attempts to reconnect the multifunction peripheral 200 to the information management server 100, and advances to S160. The process executed by the processor 210 to attempt to reconnect the multifunction peripheral 200 to the information management server 100 is an example of the reconnection attempting process.

In S160 the processor 210 determines whether the multifunction peripheral 200 has been reconnected with the information management server 100 based on the reconnect command described above. The processor 210 continues to loop back to the determination in S160 while a reconnected state has not been established (S160: NO). When the processor 210 determines that the multifunction peripheral 200 has been reconnected to the information management server 100 (S160: YES), the processor 210 returns to S115 described above. When YES determination made in S160, the processor 210 may set the connection flag FC to 1, and thereafter return to S115. In this case, since the warning flag Fa was set to 1 in S150, the processor 210 reaches a YES determination in S115 and advances to S170. In S170 the processor 210 displays a warning cancellation in a suitable screen on the touchscreen 240 indicating that the warning displayed in S145 has been cancelled and that printing is allowed. In S170 the processor 210 may reset the warning flag to 0. In other words, the multifunction peripheral 200 removes the warning from the touchscreen 240. The process executed by the processor 210 in S170 is an example of the warning cancellation display process. Subsequently, the processor 210 advances to S125 and repeats the procedure described above.

Effects of the Embodiment

In the embodiment described above, the multifunction peripheral 200 can communicate with the information management server 100 when the user performs the specific operations on the multifunction peripheral 200. The ability of the multifunction peripheral 200 to communicate with the information management server 100 is switched according to whether a printing agreement has been established.

Specifically, when a printing agreement has not been established, the "Subscription Service" button is hidden on the display, for example, preventing the user from performing the specific operations (S1). Consequently, the multifunction peripheral 200 and the information management server 100 will not communicate with each other in response to the user performing the specific operation.

Once an agreement has been established, on the other hand, the multifunction peripheral 200 begins displaying the "Subscription Service" button, enabling the user to perform the specific operations (S11). Consequently, the multifunction peripheral 200 and information management server 100 can communicate with each other when the user performs the specific operations.

As a result of the above process, the multifunction peripheral 200 can be prevented from connecting to the information management server 100 in a situation which is before an agreement is established and in which communication between the multifunction peripheral 200 and the information management server 100 is unnecessary. On the other hand, the multifunction 200 can be enabled to connect to the information management server 100 in a situation which is after an agreement has been established and in which such communication is necessary. Accordingly, the multifunction peripheral 200 can prevent the needless communications, and unexpected and erroneous user operations described in the prior art.

One feature of the embodiment is that the touchscreen 240 includes a "Connection Wizard" button or a "Retry Connecting" button as reconnection command units for attempting to reconnect the multifunction peripheral 200 to the information management server 100. Specifically, by operating the "Connection Wizard" button or the "Retry Connecting" button when the multifunction peripheral 200 is offline, i.e., when the multifunction peripheral 200 is disconnected from the information management server 100, the multifunction peripheral 200 can attempt to reconnect to the information management server 100 to communicate with the same.

In a case that a printing agreement has not been established, the multifunction peripheral 200 executes a process to hide the "Subscription Service" button, for example, preventing the user from operating the "Connection Wizard" button or the "Retry Connecting" button for reconnecting the multifunction peripheral 200 to the information management server 100. However, in a case that an agreement has been established, the multifunction peripheral 200 executes a process to start displaying the "Subscription Service" button, for example, enabling the user to operate the "Connection Wizard" button or the "Retry Connecting" button. Accordingly, the user can reconnect the multifunction peripheral 200 to the information management server 100 so that the multifunction peripheral 200 can communicate with the information management server 100.

As a result of the above process, the multifunction peripheral 200 can be prevented from reconnecting to the information management server 100 in a situation before an agreement has been established in which the multifunction peripheral 200 does not need to reconnect to and communicate with the information management server 100. The multifunction peripheral 200 can be enabled to connect to the information management server 100 in a situation after an agreement has been established in which the multifunction peripheral 200 must reconnect to the information management server 100 in order to communicate with the same.

Another feature of the embodiment is that the touchscreen 240 includes the "Connection Wizard" button that is displayed in an operable state. The "Connection Wizard" button is not displayed and thus is inoperable when the "Subscription Service" button is hidden. Accordingly, the multifunction peripheral 200 can prevent the user from performing the specific operation by not displaying the "Connection Wizard" button when a printing agreement has not been established. In this way, the multifunction peripheral 200 can reliably prevent communications between the multifunction peripheral 200 and the information management server 100.

Another feature of the embodiment is that the "Connection Wizard" button is not displayed on the touchscreen 240 before an agreement has been established and is displayable on the touchscreen 240 after an agreement has been established. Accordingly, the user can be reliably prevented from connecting the multifunction peripheral 200 to the information management server 100 prior to an agreement being established, while the user can reliably connect the multifunction peripheral 200 to the information management server 100 after an agreement has been established.

Another feature of the embodiment is that object display data for displaying the "Connection Wizard" button and the like is stored in the object storage area 221 of the volatile storage device 220 in advance. Accordingly, the multifunction peripheral 200 can use this stored object display data to switch the "Connection Wizard" button to an operable displayed state once a printing agreement has been established, without requiring the use of a special program or the like for displaying buttons and the like.

Another feature of the embodiment is that "Connected" is displayed in the status display screen 240E after a printing agreement has been established and while a connected state between the multifunction peripheral 200 and the information management server 100 is maintained. Accordingly, the multifunction peripheral 200 can clearly display the connected status of the multifunction peripheral 200 and the information management server 100 so that the user can easily recognize this status.

Another feature of the embodiment is that the advanced settings screen 240C is provided with the "Subscription Service" button for accessing information which is related to the printing agreement and includes the "Connection Wizard" button. Specifically, the "Subscription Service" button is in an inoperable state before a printing agreement is established and in an operable state after a printing agreement has been established. Accordingly, the multifunction peripheral 200 can reliably prevent the user from connecting the multifunction peripheral 200 to the information management server 100 before an agreement has been established by preventing access to the "Connection Wizard" button and can reliably enable the user to connect the multifunction peripheral 200 to the information management server 100 after an agreement has been established through access to the "Connection Wizard" button.

Another feature of the embodiment is that the touchscreen 240 is provided with the "Retry Connecting" button and the "Connection Wizard" button, as well as the "Connected" display indicating the connected status with the information management server 100. The display 240 is further provided with the "Subscription Service" button for accessing these buttons and information. The "Subscription Service" button is in an inoperable state while a printing agreement has not been established and in an operable state after a printing agreement has been established. This configuration can prevent the user from needlessly accessing the "Connected" display and the "Retry connecting" and "Connection Wizard" buttons while an agreement has not been established and can reliably enable the user to access this information when an agreement has been established.

It is further preferable for the multifunction peripheral 200 to be constantly connected to the information management server 100 over the network NT, assuming that the multifunction peripheral 200 has established an agreement related to the information management server 100 as described above. However, for some reasons, the multifunction peripheral 200 may be disconnected from the information management server 100. Therefore, a feature of the embodiment is to provide a prescribed upper limit to the number of pages that can be printed when the multifunction peripheral 200 is offline, i.e., disconnected from the information management server 100. In a case that the multifunction peripheral 200 determines in S140 of FIG. 6 that the number of pages which is printed while the multifunction peripheral 200 is offline has reached this upper limit, in S145 the multifunction peripheral 200 displays a prescribed warning. In a case that the warning is displayed, the user subsequently attempts to reconnect the multifunction peripheral 200 to the information management server 100 through an operation on the touchscreen 240. When the reconnection is successful, in S170 the multifunction peripheral 200 removes the warning from the touchscreen 240. Thus, the user can recognize that image formation with the printer 290 is performed under a prescribed limitation while the multifunction peripheral 200 is temporarily offline. The user can also recognize that the limitation is removed when the multifunction peripheral 200 is subsequently reconnected to the information management server 100, and printing can be executed based on the original agreement.

Another feature of the embodiment is that in a case that a prescribed agreement once established as described above is subsequently cancelled, the multifunction peripheral 200 executes a process for hiding the "Subscription Service" button or the like, thereby once again preventing the user from performing the specific operations (S53). In other words, when communication between the multifunction peripheral 200 and the information management server 100 becomes unnecessary, the multifunction peripheral 200 can prevent needless communication, and unexpected and erroneous user operations.

Another feature of the embodiment is that the user can execute the specific operations after the multifunction peripheral 200 has received the agreement completion notification (agreement start information) from the information management server 100 (see S9 in FIG. 2). In other words, any specific operation cannot be performed before the completion notification is received. In this way, the multifunction peripheral 200 can prevent needless communications, and unexpected and erroneous user operations before the printing agreement is established, and can promptly cancel these preventions of communications and operations after the printing agreement is established.

Modifications

While the disclosure has been described in detail with reference to the specific embodiment thereof, it would be apparent to those skilled in the art that various changes and modifications may be made therein without departing from the scope of the invention. In the following modifications, like parts, components, processes are designated with the same reference numerals to avoid duplicating description.

Figure 7:
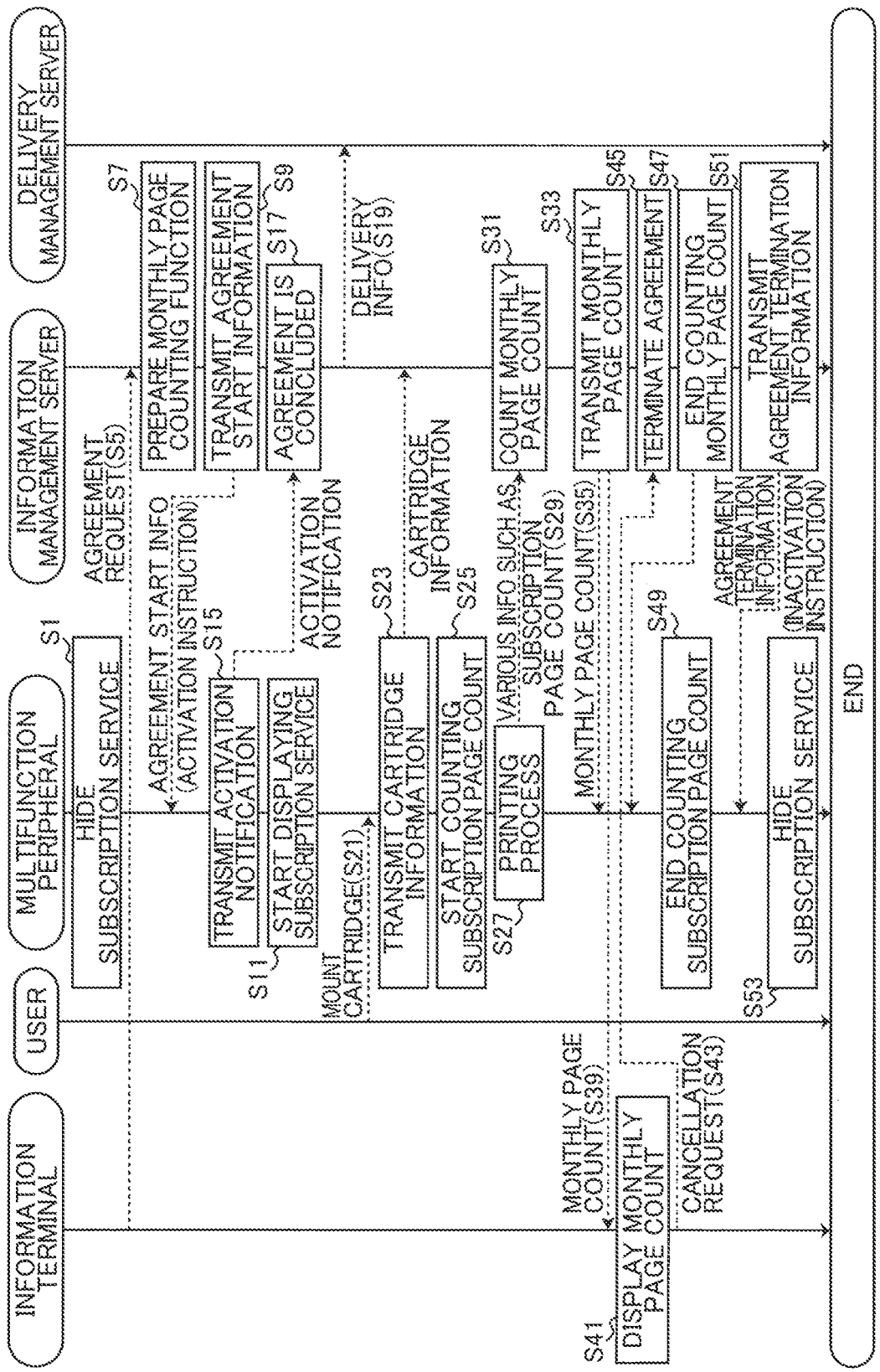
FIG. 7 is a sequence chart illustrating processes executed by the information terminal, the multifunction peripheral, the information management server, and the delivery management server according to a variation (1) in which display of a "Subscription Service" button is started after an agreement acceptance notification is transmitted.

(1) Starting Display of "Subscription Service" Button after Transmitting an Agreement Acceptance Notification to the Information Management Server The sequence chart in FIG. 7, which corresponds to FIG. 2 described in the embodiment, shows a variation (1) of the process executed by the multifunction peripheral 200, the information management server 100, the delivery management server 400, and the information terminal 300.

In the variation shown in FIG. 7, step S11 is executed after step S15. That is, after the multifunction peripheral 200 receives the agreement start information from the information management server 100 in S9, in S15 the multifunction peripheral 200 transmits an agreement acceptance notification to the information management server 100, and in S17 the information management server 100 receives this notification. Subsequently, in S11 the multifunction peripheral 200 starts displaying "Subscription Service" button. The remainder of the process is identical to that in FIG. 2 and will not be described here.

According to the present variation, the "Subscription Service" button is displayed to enable the specific operations after the multifunction peripheral 200 receives the agreement start information for a printing agreement from the information management server 100 and transmits a response to the information management server 100. In other words, the specific operations are disabled prior to this agreement start information being received. In this way, the multifunction peripheral 200 can prevent needless communications, and unexpected and erroneous user operations before the printing agreement is established, and can promptly cancel these preventions of communications and operations after the printing agreement is established.

Figure 8:
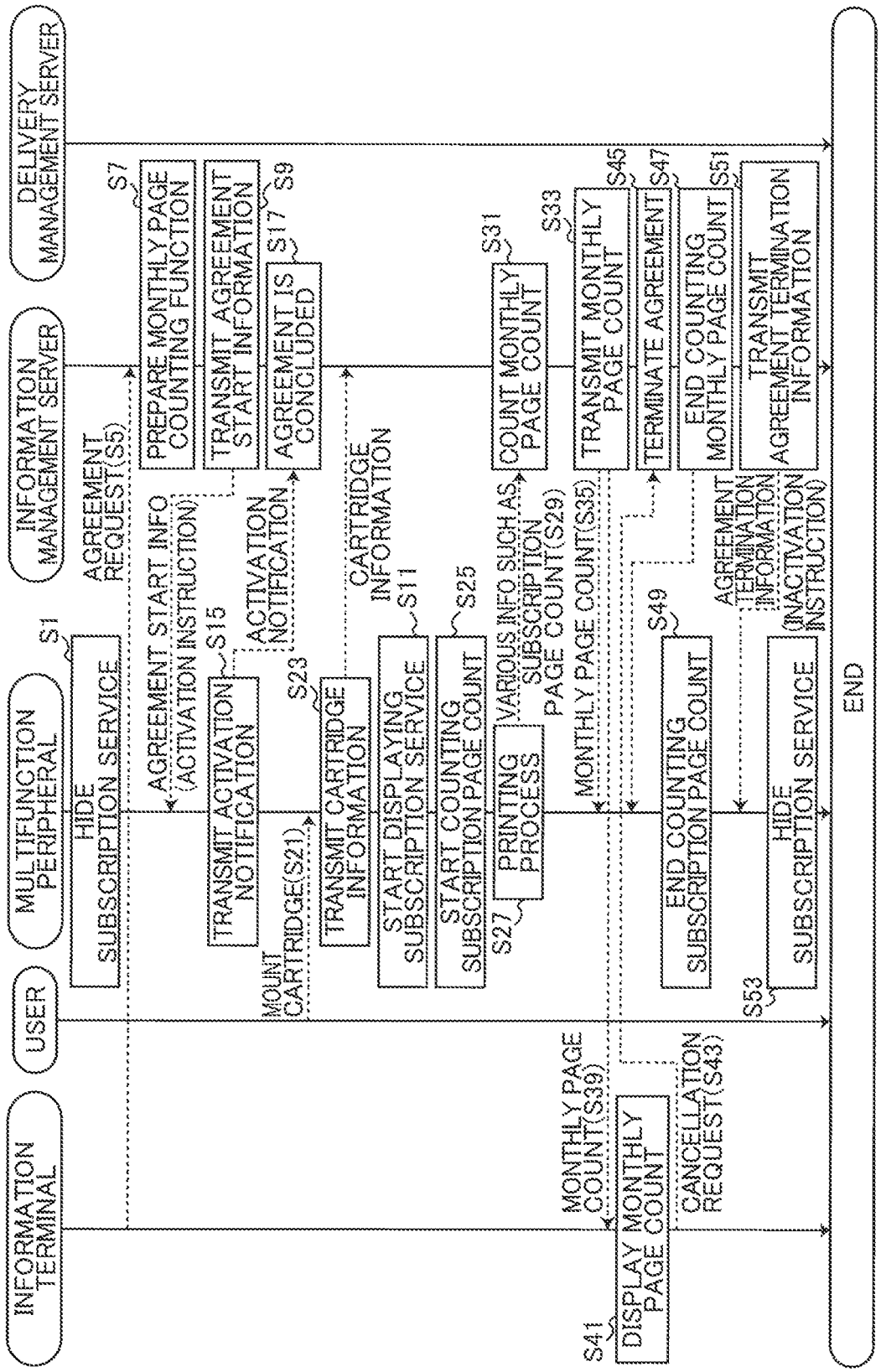
FIG. 8 is a sequence chart illustrating processes executed by the information terminal, the multifunction peripheral, the information management server, and the delivery management server according to a variation (2) in which display of a "Subscription Service" button is started after cartridges are mounted in a cartridge holder.

(2) Starting Display of "Subscription Service" Button after Cartridges are Mounted The sequence chart in FIG. 8, which corresponds to FIG. 2 described in the embodiment, shows a variation (2) of the process executed by the multifunction peripheral 200, the information management server 100, the delivery management server 400, and the information terminal 300.

In this variation, the type of subscription cartridges 50 used are pre-configured so that starting charges based on the printing agreement can be triggered by the subscription cartridges 50 being mounted in the cartridge holder 51. This type of ink cartridges 50 can function as normal ink cartridges 50 prior to a printing agreement being established, and can function as subscription cartridges 50 after a printing agreement is established based on control of the processor 210 in response to the subscription cartridges 50 being mounted in the cartridge holder 51. Hereinafter, this type of ink cartridge 50 will be called a "multifunction cartridge 50." The multifunction cartridge 50 is an example of the specific cartridge. These multifunction cartridges 50 are either included with the multifunction peripheral 200 when the user purchases and installs the multifunction peripheral 200 or are provided to the user at the same time of the purchase or the installation, for example. Thus, the process of S19 in FIG. 2 is omitted from FIG. 11.

In the variation shown in FIG. 11, steps S11 and S13 of FIG. 2 are executed after step S23. That is, in S9 the multifunction peripheral 200 receives agreement start information from the information management server 100 and in S15 transmits an agreement acceptance notification to the information management server 100. The information management server 100 receives the notification in S17. When the user subsequently mounts the multifunction cartridge(s) 50 in the cartridge holder 51 in S21, in S23 the multifunction peripheral 200 detects and identifies the multifunction cartridge(s) 50 being mounted, and thus transmits cartridge information acquired by the communication unit 285 to the information management server 100. Since a printing agreement has already been established when the cartridge(s) is (are) mounted (S15, S17), the multifunction cartridges 50 can function as subscription cartridges 50 under control of the processor 210.

Next, in S11 the multifunction peripheral 200 begins displaying the "Subscription Service" button. The remainder of the process in FIG. 8 is identical to that in FIG. 2 and will not be described here.

According to the present variation, the "Subscription Service" button is displayed to enable the specific operations after multifunction cartridges 50 are mounted in the multifunction peripheral 200. In other words, the specific operations are disabled prior to the multifunction cartridges 50 being mounted. This method can prevent needless communications, and unexpected and erroneous user operations before the charging of fees according to the printing agreement begins, but promptly cancel such preventions of communications and operations once the charging of fees begins as a result of the multifunction cartridges 50 being mounted.

(3) Exceptions to Processes Performed after an Agreement is Established (First Example)

In the embodiment, the multifunction peripheral 200 begins displaying the "Subscription Service" button to enable the specific operations once a printing agreement has been established. However, this variation describes an exception in which at least one specific operations are prevented in this situation.

In the present variation, the processor 210 prevents two specific operations in a case that a printing agreement has been established and "Connected" is displayed in the status display screen 240E (or, display of "Connected" is permitted or enabled) since the multifunction peripheral 200 and the information management server 100 are already connected, even while displaying the "Subscription Service" button. Accordingly, when the multifunction peripheral 200 and the information management server 100 are already connected and do not need to be reconnected, this process can prevent the user from performing an unexpected and erroneous operation after a printing agreement has been established.

Even in this case, the processor 210 may attempt to reconnect the multifunction peripheral 200 to the information management server 100 and may display the results in the touchscreen 240, as described in the connection attempt display screen 240F and connection success display screen 240G of FIG. 5 in order to prioritize the user's requirements. In other words, in a case that the user operates the "Retry Connecting" button or the "Connection Wizard" button even though the multifunction peripheral 200 is online, i.e., connected to the information management server 100, the processor 210 will attempt to reconnect to the information management server 100 and display the connection results on the touchscreen 240. In this way, the multifunction peripheral 200 can respond to cases in which the user wishes to reconnect to the information management server 100 for whatever reason and can display the results in a clear manner that the user can understand.

(4) Exceptions to Processes Performed after an Agreement is Established (Second Example)

This variation, as in variation (3) described above, describes an exception in which the multifunction peripheral 200 makes the "Subscription Service" button inoperable after a printing agreement has been established.

In this variation the processor 210 hides the "Subscription Service" button as an exception even after a printing agreement has been established. Specifically, the processor 210 hides the "Subscription Service" button from the time the power to the multifunction peripheral 200 is turned on until a connection with the information management server 100 has been established even in a case that the printing agreement has been established. Once the multifunction peripheral 200 has successfully connected to the information management server 100, the multifunction peripheral 200 begins displaying the "Subscription Service" button in an operable state.

Thus, the present variation disables the "Subscription Service" button despite a printing agreement having been established. This method can prevent the user from needlessly operating the "Subscription Service" button while a network connection has not been completed and the multifunction peripheral 200 cannot communicate with the information management server 100, despite a printing agreement having been established.

(5) Using Mechanical Buttons on the Multifunction Peripheral

When the multifunction peripheral 200 is provided with mechanical operating interfaces instead of the touchscreen 240 described in the embodiment, a different method from the method described above may be employed. That is, the service display screen 240D may be displayed through a complex operation involving simultaneously pressing a power switch, "Copy" button, and "Scan" button (not shown) provided as the mechanical operating interfaces in the multifunction peripheral 200, for example. In this case, the "Connection Wizard" button may be operably displayed in the service display screen 240D on the touchscreen 240 so that the multifunction peripheral 200 can attempt to connect with the information management server 100. In this variation, the series of operations are an example of the specific operation. Additionally, the multifunction peripheral 200 may be provided with a mechanical "Reconnect" button (not shown) for attempting to reconnect the multifunction peripheral 200 to the information management server 100.

In this variation, the multifunction peripheral 200 under control of the processor 210 effectively disables the specific operations at a stage prior to the printing agreement being established, such as in step S1. Hence, even in a case that the user performs the complex operation described above, the multifunction peripheral 200 will not accept such a operation and will not switch the display on the touchscreen 240 to the service display screen 240D. Subsequently, at a stage after the printing agreement has been established, such as in step S11, the multifunction peripheral 200 under control of the processor 210 switches the display to the service display screen 240D when the user performs the complex operation described above, thereby enabling various operations and effectively allowing the specific operations. Thus, as in the embodiment described above, the method of this variation can prevent the multifunction peripheral 200 from connecting to the information management server 100 prior to an agreement being established when there is no need for communications between the multifunction peripheral 200 and the information management server 100 and can allow the multifunction peripheral 200 to connect to the information management server 100 after an agreement is established and such communication is necessary. As described above, this method can prevent needless communications, and unexpected and erroneous user operations.

In addition to the above variation, a lamp that can emit light is provided at a suitable location on the multifunction peripheral 200. Before a printing agreement is established the light is turned off. After a printing agreement is established, the light is turned on while a connection with the information management server 100 is maintained, to indicate the connection status. This type of process executed by the processor 210 is an example of the lighting process. By turning on the lamp after a printing agreement is established and leaving the lamp on while the multifunction peripheral 200 remains connected to the information management server 100, the multifunction peripheral 200 can clearly indicate the connected status between the multifunction peripheral 200 and the information management server 100 so that the user can easily recognize this status.

Further, while the lamp is on as described above, the processor 210 may implement an exception to disable one or more specific operations even though the printing agreement has been established. In this way, the multifunction peripheral 200 can prevent the user from performing an unexpected and erroneous operation in a case that the multifunction peripheral 200 is already connected to the information management server 100 and a reconnection is not necessary even though an agreement has been established.

(6) In the embodiment described above, a multifunction peripheral 200 printing an image according to an inkjet method is described as an example of the printing device. However, the printing device is not limited to this. For example, the printing device may be a device printing an image by other methods such as a laser printing method or a thermal transferring printing method. This variation can obtain the same effects described above.

While a printing device for forming images on recording media is used as an example of the image processing device in the above description, the present invention is not limited to a printing device. For example, the present invention may be applied to an image-reading device (scanning device). Under a service agreement, the image-reading device reads an object and generates image data, and transmits the image data to a server, and the server transmits the image data to an information terminal, such as a mobile terminal, a personal computer, or a tablet computer. In this case, the image-reading device is an example of the image-processing device. This variation can obtain the same effects described above.

Further, the sequence charts and flowcharts in FIGS. 2, 6, 7, 8, etc. do not limit the present invention to the steps indicated therein. Steps may be added or deleted, or their order may be rearranged.

Further, the methods according to the embodiment and the variations described above may be used in suitable combinations in addition to those already described.

What is claimed is:

1. An image processing device comprising:
 a communication interface configured to communicate with a server;
 an operation interface including a display configured to operably display a first object; and
 a controller configured to perform:
  in a case that an agreement is not established for subscription service using the server, an operation disabling process to disable a specific operation using the operation interface, the specific operation being to cause the communication interface to communicate with the server;
  in a case that the agreement is established, an operation enabling process to enable the specific operation using the operation interface; and
  in a case that the agreement is established and connected status between the image processing device and the server is maintained, a second object display process to control the display to display a second object indicating the connected status,
 wherein in a case that display of the second object is allowed, the operation enabling process disables the specific operation using the operation interface.

2. The image processing device according to claim 1, wherein the operation interface includes a connection commanding button configured to instruct to attempt reconnection to the server in a case that the communication interface is disconnected from the server.

3. The image processing device according to claim 2, wherein the controller is configured to further perform:
 in a case that the connection commanding button is operated while the communication interface maintains connection with the server, attempting reconnection to the server;
 determining whether the communication interface is reconnected to the server as a result of the attempting; and,
 controlling the display to display the result of the attempting.

4. The image processing device according to claim 2, further comprising:
 a printer configured to print an image on a recording medium,
 wherein the controller is configured to further perform:
  an upper limit determination process to determine whether printing number reaches a prescribed upper limit, the printing number indicating number of printing operations performed by the printer in a state that the communication interface is disconnected from the server;
  in a case that the printing number reaches the prescribed upper limit, a warning display process to display on the display a warning corresponding to the printing number reaching the prescribed upper limit;
  in a case that the specific operation is performed while the warning is displayed on the display, a reconnection attempting process to control the communication interface to attempt to reconnect to the server; and
  in a case that the reconnection to the server is successful as a result of the reconnection attempting process, a warning cancellation display process to display on the display a warning cancellation display corresponding to the reconnection being successful.

5. The image processing device according to claim 1, wherein in the operation disabling process, the controller controls the display not to display the first object,
 wherein in the operation enabling process, the controller controls the display to display the first object.

6. The image processing device according to claim 1, further comprising a storage storing display data representing the first object,
 wherein the controller is configured to further perform:
  switching the display from a disabled state to an enabled state, in the disabled state the specific operation using the first object being disabled in accordance with the operation disabling process, in the enabled state the first object being displayed based on the display data so that the specific operation using the first object is enabled in accordance with the operation enabling process.

7. The image processing device according to claim 1, wherein the display is configured to operably display a third object, operation of the third object enabling to display agreement information, the agreement information concerning the agreement and including the first object,
 wherein the controller is configured to further perform:
  before the agreement is established, a third object disabling process to control the third object to be in an inoperable state; and
  in the case that the agreement is established, a third object enabling process to control the third object to be in an operable state.

8. The image processing device according to claim 7, wherein in the third object enabling process, the controller controls the third object to be in an inoperable state after the image processing device is turned on until connection between the image processing device and the server is established,
  wherein in the third object enabling process, the controller controls the third object to be in the operable state after the connection is established.

9. The image processing device according to claim 1, further comprising a lamp,
  wherein the controller is configured to further perform:
    in a case that the agreement is established and the connected status between the image processing device and the server is maintained, a lamp turning-on process to turn on the lamp to indicate that the connected status is maintained.

10. The image processing device according to claim 9, wherein in a case the lamp is turned on, the controller disables the specific operation using the operation interface in the operation enabling process.

11. The image processing device according to claim 1, wherein after a completion notification notifying of establishment of the agreement is received from the server, the controller performs the operation enabling process.

12. The image processing device according to claim 1, wherein after a completion notification notifying of establishment of the agreement is received from the server and the controller transmits a response to the completion notification to the server, the controller performs the operation enabling process.

13. The image processing device according to claim 1, further comprising a cartridge holder in which a cartridge is mounted,
  wherein after a specific cartridge is mounted in the cartridge holder, the controller performs the operation enabling process, the specific cartridge being configured so that starting of charging based on the agreement can be triggered by the specific cartridge being mounted in the cartridge holder.

14. An image processing device comprising:
  a communication interface configured to communicate with a server;
  an operation interface; and
  a controller configured to perform:
    in a case that an agreement is not established for subscription service using the server, an operation disabling process to disable a specific operation using the operation interface, the specific operation being to cause the communication interface to communicate with the server; and
    in a case that the agreement is established, an operation enabling process to enable the specific operation using the operation interface,
  wherein the operation interface includes a display configured to operably display an access button and a reconnection button, operation of the access button being required to access the reconnection button,
  wherein the reconnection button is for commanding to attempt to reconnect the communication interface to the server in a case that the communication interface is disconnected from the server,
  wherein the controller is configured to further perform:
    before the agreement is established, an access disabling process to control the access button to be in an inoperable state;
    in a case that the agreement is established, an access button enabling process to control the display to display the access button in an operable state so that the reconnection button is displayed through the operation of the access button; and
    in a case that the agreement is established and connected status between the image processing device and the server is maintained, a connected status display process to control the display to display a connected status display indicating the connected status, operation of the access button being required to access the connected status display.

15. A non-transitory computer readable storage medium storing a set of program instructions installed on and executed by a computer included in an image processing device, the image processing device further including: a communication interface configured to communicate with a server; and an operation interface including a display configured to operably display a first object, the set of program instructions comprising:
  in a case that an agreement is not established for subscription service using the server, performing an operation disabling process to disable a specific operation using the operation interface, the specific operation being to cause the communication interface to communicate with the server;
  in a case that the agreement is established, performing an operation enabling process to enable the specific operation using the operation interface; and
  in a case that the agreement is established and connected status between the image processing device and the server is maintained, a second object display process to control the display to display a second object indicating the connected status, and
  wherein in a case that display of the second object is allowed, the operation enabling process disables the specific operation using the operation interface.

* * * * *